(12) United States Patent
Sluiman et al.

(10) Patent No.: US 7,007,269 B2
(45) Date of Patent: Feb. 28, 2006

(54) METHOD OF PROVIDING OPEN ACCESS TO APPLICATION PROFILING DATA

(75) Inventors: Harm Sluiman, Scarborough (CA); Mike Wulkan, Markham (CA)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/093,464

(22) Filed: Mar. 7, 2002

(65) Prior Publication Data

US 2004/0210877 A1    Oct. 21, 2004

(30) Foreign Application Priority Data

| Mar. 14, 2001 | (CA) | ................................. 2340991 |
| Jun. 15, 2001 | (CA) | ................................. 2350735 |

(51) Int. Cl.
*G06F 9/44*    (2006.01)
(52) U.S. Cl. ...................... 717/130; 717/127; 717/158
(58) Field of Classification Search ............... 719/318; 715/513, 500; 714/45; 717/130, 124–132, 717/141–143, 158–159; 709/202, 223; 705/26, 705/10, 1; 707/3, 4; 706/1
See application file for complete search history.

(56) References Cited

U.S. PATENT DOCUMENTS

| 6,343,287 | B1 * | 1/2002 | Kumar et al. ................... 707/4 |
| 6,446,136 | B1 * | 9/2002 | Pohlmann et al. ........... 719/318 |
| 6,470,332 | B1 * | 10/2002 | Weschler ....................... 707/3 |
| 6,484,203 | B1 * | 11/2002 | Porras et al. ................ 709/224 |
| 6,513,155 | B1 * | 1/2003 | Alexander et al. .......... 717/124 |
| 6,546,548 | B1 * | 4/2003 | Berry et al. ................. 717/128 |
| 6,651,243 | B1 * | 11/2003 | Berry et al. ................. 717/130 |
| 6,728,949 | B1 * | 4/2004 | Bryant et al. ............... 717/127 |
| 6,728,955 | B1 * | 4/2004 | Berry et al. ................. 717/158 |
| 6,732,153 | B1 * | 5/2004 | Jakobson et al. ........... 709/206 |
| 6,735,758 | B1 * | 5/2004 | Berry et al. ................. 717/130 |
| 6,751,663 | B1 * | 6/2004 | Farrell et al. ............... 709/224 |
| 6,754,890 | B1 * | 6/2004 | Berry et al. ................. 717/128 |

(Continued)

OTHER PUBLICATIONS

Chen et al, "Dynamic trace selection using performance monitoring hardware sampling", IEEE, pp 79-90, 2003.*

(Continued)

*Primary Examiner*—Anil Khatri
(74) *Attorney, Agent, or Firm*—Stephen J. Walder, Jr.; Jeffrey S. LaBaw

(57) ABSTRACT

A data structure for exchanging profiling data in the form of trace elements between collection agents and analysis agents in a profiling tool, wherein the data structure comprises elements for identifying fragments, and attributes defining a logical hierarchy between the trace elements. A system is also set forth for providing access to profiling data of an application over an network, comprising a profiling interface for transmitting event data from the application, a collection agent for receiving and encoding the event data in trace element fragments each containing at least one attribute, and in response transmitting the fragments over the network, and at least one analysis client for receiving and collating the fragments in accordance with the at least one attribute.

27 Claims, 7 Drawing Sheets

U.S. PATENT DOCUMENTS

| | | | |
|---|---|---|---|
| 6,757,720 B1 * | 6/2004 | Weschler, Jr. | 709/220 |
| 6,813,731 B1 * | 11/2004 | Zahavi et al. | 714/45 |
| 6,839,680 B1 * | 1/2005 | Liu et al. | 705/10 |
| 2002/0128925 A1 * | 9/2002 | Angeles | 705/26 |
| 2003/0067542 A1 * | 4/2003 | Monroe | 348/148 |
| 2004/0098449 A1 * | 5/2004 | Bar-Lavi et al. | 709/202 |
| 2004/0194025 A1 * | 9/2004 | Hubert et al. | 715/513 |
| 2004/0205473 A1 * | 10/2004 | Fisher et al. | 715/500 |

OTHER PUBLICATIONS

Ball et al, "Efficient path profiling", IEEE, pp 46-57, 1996.*
Rajagopalan et al, "Profile directed optimization of event based programs", ACM PLDI, pp 106-116, Jun. 2002.*
Putrycz, "Using trace analysis for improving perfoemance in COTS systems", ACM, Proc. of 2004 Conf. of the center for Adav. Studies on Collabrotive Resh, pp 68-80, Oct. 2004.*

* cited by examiner

FIG. 2

\<traceRoot\>

\<node/\>

\<processCreate/\>

\<agentCreate/\>

*all other events*

\<agentDestroy/\>

\</traceRoot\>

FIGURE 12

```xml
<?xml version="1.0"?>
<TRACE>
<node nodeId="60646da0 - 3298 -11d5 - a73d - a0c48e000000"
hostname="wulkan" ipaddress="9.21.147.206" timezone="300"
time="987446608.3203920"/>
<processCreate processId="60646da1 - 3298 -11d5 - a73d - a0c48e000000"
pid="405" nodeIdRef="60646da0 - 3298 - 11d5 - a73d - a0c48e000000"
time="987446608.3203920" environment="unknown"
application_executable="java -classpath .\;..
\runtime\logutil.jar -XrunPIAgent:
server=standalone HelloWorld"/>
<agentCreate agentId="1db79b00 - c49c - 11d4 - b84b - 002035f20084"
version="1.000" processIdRef="60646da1 - 3298 - lld5 -
a73d - a0c48e000000" agentName="Java Profiling Agent"
agentParameters="server=standalone"
time="987446612.090000"/>
<traceStart traceId="60646da2 - 3298 - 11d5 - a73d-a0c48e000000"
agentIdRef="1db79b00 - c49c - 11d4 - b84b - 002035f20084"
time="987446612.180759"/>
<option key="CLASS_LOAD_DETAILS" value="false"/>
<option key="COLLATION_VALUES" value="false"/>
<option key="CONTEXT_FLOW" value="false"/>
   •
   •
   •
<threadStart threadId="2" time="987446612.235716"
threadName="main" groupName="main" parentName="system"
objIdRef="2618"/>
<runtimeInitDone threadIdRef="2" time="987446612.235748"/>
<objAlloc threadIdRef="2" time="987446612.236304" objId="2627"
classIdRef="2617" size="16"/>
<objAlloc threadIdRef="2" time="987446612.236354" objId="2628"
classIdRef="173" size="6"/>
<methodDef name="-init-"
signature="(Ljava/lang/ThreadGroup;Ljava/lang/String;)V"
methodId="2612" classIdRef="2617"/>
<methodEntry threadIdRef="2" time="987446612.236409"
methodIdRef="2612" objIdRef="2627" classIdRef="2617"
threadCpuTime="0.2303312" stackDepth="1"/>
   •
   •
   •
<threadEnd threadIdRef="3" time="987446628.066260"/>
<runtimeShutdown threadIdRef="1" time="987446628.066343"/>
<traceEnd time="987446628.066360"/>
<agentDestroy agentIdRef="1db79b00 - c49c - lld4 -
b84b - 002035f20084" time="987446628.066371"/>
<TRACE>
```

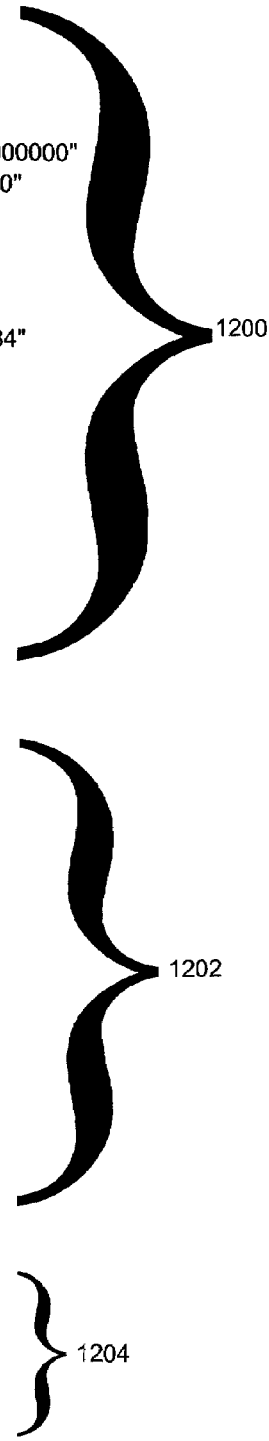

1200

1202

1204

METHOD OF PROVIDING OPEN ACCESS TO APPLICATION PROFILING DATA

FIELD OF INVENTION

This invention relates generally to profiling tools for analyzing the execution path or characteristics of a software application, and more particularly to a method and apparatus for providing open access to application profiling data across a network.

BACKGROUND OF THE INVENTION

Profiling tools are used to evaluate applications for a variety of purposes including, for example, "trouble shooting", "application tuning", and "resource utilization optimization". It is known in the prior art to use profiling tools that analyze a software execution path in a specific execution environment, language or operating system. However, where the application consists of more than one process or more than one language (e.g. a simple client-server networked application where the client is written in Java and the server has C stored procedures in an Relational Database Management System (RDBMS)), the client profiling tool traces only the single client activity, and is not capable of tracing the execution path across the network.

To further compound these problems, prior art profiling tools incorporate vendor specific or proprietary data collection engines and data exchange formats. Consequently, it is difficult to correlate execution traces detected by different vendor profiling tools in a distributed system incorporating diverse execution environments, languages and/or operating systems. Each profiling tool requires a specific or proprietary collection agent for each execution environment.

In the prior art model of application profiling, each application is assumed to be written in one programming language and executed on one computing machine in one execution environment. The profiling traces are composed of trace events, which occur sequentially, and which are stored in large files for later transport to profiling tools. The transmission of such large files can be a significant stress on a communication system. In addition, real time or near real time profiling of application is very difficult in such a system.

The advent of computer networking, and more recently the Internet, has, however, changed and expanded what constitutes an application. Over the Internet, an application may have a number of parts, written in a number of different programming languages, distributed on a number of different computer machines, and operated in a number different execution environments (herein referred to as "distributed environment"). The machines, languages, and environments of such an application are typically from a number of different vendors.

It is exceedingly difficult to develop a profiling tool that is able to interface with all of the products that may be available from various vendors in this environment. This is assuming that the vendors are prepared to disclose their application programming interfaces (APIs) to profiling tool vendors who may be competitors. Further, any change to the APIs may cause operability problems to the profiling tools. There are significant problems with developing and maintaining profiling tools, which are able to interface with products of a number of vendors (distributed access).

Additionally, prior art profiling tools obtain and store trace events in sequential form. In a distributed environment, trace events are not sequential especially as between different machines. There is no capability to correlate trace events between different machines or processes.

Recently, the Java programming language has been expanded to define a Java Virtual Machine Profiling Tool (JVMPI) for profiling hooks in a Java virtual machine. JVMPI is a two-way function call interface between the Java virtual machine and an in-process profiler or collection agent. On the one hand, the virtual machine notifies the collection agent of various events, corresponding to, for example, heap allocation, method calls, etc. The collection agent then communicates with a front-end analysis client, which may or may not run in the same process as the collection agent. On the other hand, the collection agent issues control requests to the Java virtual machine through the JVMPI. For example, the collection agent can turn on/off a specific event notification, based on the needs of the analysis client. The client may reside in a different process on the same machine, or on a remote machine connected via a network using vendor specific wire protocol suitable to the analysis client.

Although profiling tools based on JVMPI are useful for obtaining a variety of information performance data, the prior art problems relating to lack of distributed access and correlation capabilities remain.

CLAIM TO COPYRIGHT

A portion of the disclosure of this patent document contains material, which is subject to copyright protection. The copyright owner has no objection to the facsimile reproduction by anyone of the patent document, as it appears in the Patent and Trademark Office patent file or records, but otherwise reserves all copyright rights whatsoever.

SUMMARY OF THE INVENTION

The essential problem with the prior art application profiling model is the lack of a consistent data exchange format between collection engines and analysis portions of profiling tools of different vendors. For each execution environment, the analysis portions remain essential unchanged, but each of the vendors has to modify their collection engines accordingly. The inventors have discovered that an open data exchange format may be adapted for application profiling data that allows a single collection agent in an execution environment to provide the profiling data to any number of profiling tools from different vendors. Thus, vendors are able to focus on the development of the analysis portions of their profiling tools and allow other parties, such as vendors of the execution environments, to provide the collection agents.

Conversely, the open data exchange format also allows a profiling tool to obtain analysis data from more than one collection agent using only one standard interface. Thus, a profiling tool is able to profile an application executing on more than one machine and execution environment where the data exchange format provides attributes to correlate the trace events.

The open data exchange format thus has a number of advantages including allowing application vendors to retain confidentiality and revision options for their internal APIs without affecting the profiling tools; and reducing development and maintenance costs for profiling tool vendors.

According to the present invention, an open data structure is provided for exchanging profiling data in the form of trace elements between collection agents and analysis agents in a profiling tool. The data structure accommodates transmission of the profiling data in fragments across a network for storage in a database repository or receipt by one or more analysis agents. Each of the fragments comprises one or more trace elements defining trace events. The data structure of trace elements includes attributes, which define a logical hierarchy between the trace elements. More particularly, correlation attributes are provided with each trace element to enable the analysis clients to correlate the trace elements. Each of the trace elements defines a relationship to each of the other trace elements in a trace, and is not just a sequence of collated trace elements. Thus, for example, a profiling tool is able to correlate a method call to an object.

The data structure according to the present invention facilitates distributed access to profiling data across a network. Also, only a single collection agent is required per execution environment, thereby overcoming the prior art requirement for multiple vendor-specific proprietary collection agents.

According to the preferred embodiment, the data structure for the profiling data conforms to XML (Extensible Markup Language). Thus, the load on the network to transport the profiling data is more evenly distributed as the data is sent in XML fragments instead of large files.

BRIEF DESCRIPTION OF THE DRAWINGS

A detailed description of the preferred embodiment is set forth herein below, with reference to the accompanying drawing, in which:

FIG. 2 is a logical hierarchy diagram of a traceRoot element according to the preferred embodiment;

FIG. 12 is a sample showing parts of a trace according to the preferred embodiment.

DETAILED DESCRIPTION OF THE PREFERRED EMBODIMENTS

Figure 1:
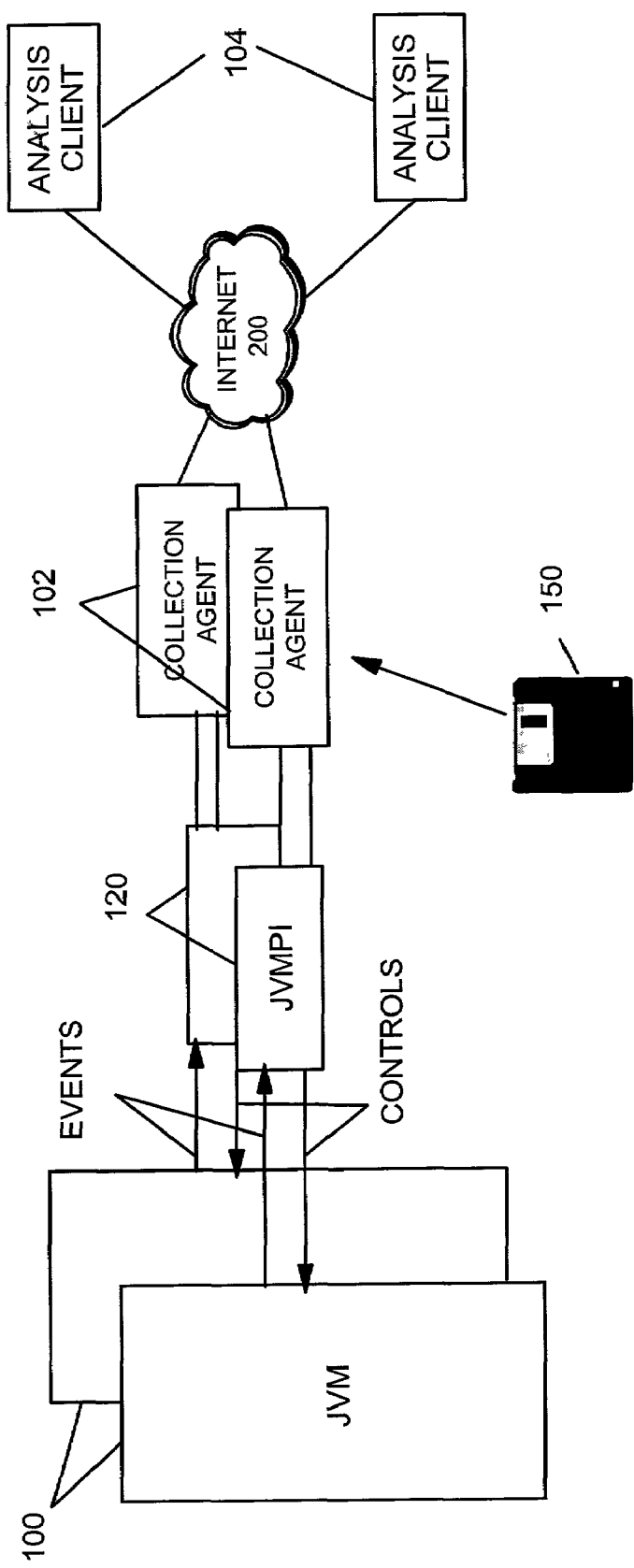
FIG. 1 is a block diagram of a profiling tool incorporating the stat structure according to the present invention.

Referring to FIG. 1, a profiling tool is shown comprising one or more Java Virtual Machines (JVM) 100, associated collection agents 102, and analysis clients 104. Each JVM 100 incorporates a Java Virtual Machine Profiling Interface (JVMPI) 120 for communicating with an associated collection agent 102. The collection agents 102 request and receive event or trace data from the JVMs 100 over the JVMPIs 120 in accordance with standard JVMPI protocol, as discussed in greater detail below. The collection agents 102 then encode and transmit the trace data in the form of trace elements, over a network (e.g. Internet 200), to at least one analysis client 104. The trace elements received by the analysis clients 104 are correlated using identification or correlation attribute definitions and references which define logical relationships between the elements, the details of which are set forth below.

The collection agents 102 are stored on computer readable mediums 150 such as, for example, diskettes, zip drives, CDs, and hard drives.

As discussed above, the preferred embodiment is described herein with reference to a Java application environment, with XML being used for implementation of the data structure. However, it is contemplated that the principles of the invention may be extended to other application environments and the data structures may be implemented using other languages, such as other mark-up languages (SGML, etc.). It is further contemplated that principles of the invention may be extended to programming languages other than object orientated languages such as Java.

The collection agent 102 uses the following command line syntax to attach itself to the JVM 100:

java -XrunpiAgent [:<option=value[,option=value]*]

[-Xbootclasspath:<location of picb.jar>,<location of rt.jar>] <Java class>

The JVM 100 attempts to locate the profiler agent library called ipAgent in the Java library directory. Once located, the JVM 100 loads the profiler agent library and hooks for the entry point in a well-known manner. The options supported in the first argument to the invocation command do not form part of the present invention. The collection agent 102 obtains a function call interface by issuing a GetEnv call on the JavaVM pointer in a well known manner. The GetEnv function returns a pointer to a JVMPI_Interface. The JVMPI_Interface returned by GetEnv has all the functions set up except for NotifyEvent. The collection agent 102 must set up the NotifyEvent function pointer.

The JVM 100 sends an event, through the JVMPI 120, to the collection agent 102 by calling NotifyEvent with a JVMPI_Interface data structure as the argument. The JVMPI_Event structure contains the event type, the pointer of the current thread, and other event-specific information, all of which is well known according to the JVMPI specification.

The event-specific information of a trace event is received by the collection agent 102 and is then converted to a data structure in the format of trace elements, which, as discussed above, define or represent trace events of object oriented programming languages.

The trace elements of a trace are emitted to Analysis Clients 104 as XML fragments, where each XML fragment comprises one or more trace elements. Alternatively, the trace elements may be collected and emitted to the Analysis Clients 104 as XML document. The trace elements are formatted as text in compliance with the XML standard.

According to the present embodiment of the invention, the trace elements represent logic components of object oriented programming languages. The logic components include, for example, threads, methods, objects, and classes. Trace elements further include elements to provide context information about a trace as a whole such as, for example, a node trace element to identify the JVM 100 that a trace event is from.

Each of the trace elements contains at least one correlation attribute. A number of different correlation attributes are defined according to this invention. The correlation attributes include other trace elements, reference numbers, time information, and counter information. The primary correlation attribute for associating a trace element to a parent element is by referring to the parent trace element and parent reference number. In particular, each parent trace element or identifier (Id) has a reference number attribute. All parent events are represented by trace elements (or Ids) and are further assigned unique identifying reference numbers. All related or associated trace elements reference parent trace elements (or Ids) and their reference numbers in a nested logical hierarchy. Trace elements in combination with reference numbers uniquely identify instances of certain components of the application.

According to the present embodiment of the invention, the trace elements for defining tracing events of object oriented programming languages are listed in Table 1 in the Id (identifier) column. Each Id has a defining element and an undefining element as shown in Table 1. A defining element provides the information related to an Id. For example, the defining element for a thread Id (see below) contains, among other entries, the name of the thread.

An Id is valid until its undefining element arrives. Where a defining element is enabled, the defining element is sent before the Id appears in other elements. An undefining element invalidates the Id. There are two kinds of Ids; transient Ids and non transient Ids. Both have the same logical lifetime as prescribed by their defining and undefining elements. However, transient Id values may be reused after they have been undefined, and in fact may be reused as a different type of Id. The value of a transientThreadId, for example, may be redefined as a transientClassId after a thread ends. Non transient Ids are unique within the scope of a trace.

TABLE 1

| Id | Defining element | Undefining element |
|---|---|---|
| ThreadId | ThreadStart | threadEnd |
| TransientThreadId | ThreadStart | threadEnd |
| ObjId | ObjAlloc | objFree |
| TransientObjId | objAlloc, objMove, objDef | objFree, objMove |
| ClassId | ClassDef | classUnload |
| TransientClassId | ClassDef | classUnload |
| MethodId | MethodDef | defining classUnload |
| TransientMethodId | MethodDef | defining classUnload |
| LineTableId | LineTable | not applicable |
| NodeId | Node | not applicable |
| ProcessId | ProcessCreate | not available |
| AgentId | AgentCreate | agentDestroy |
| TraceId | TraceStart | traceEnd |

Identifiers (Ids) and identifier references (IdRef) define a logical hierarchy between the various trace elements. Thus, as discussed in greater detail below with reference to FIGS. 2–11, threads, classes, methods, and objects each have unique Ids which are referenced by other elements in accordance with defined relationships of the Id/IdRef attributes. Specifically, with reference to FIG. 2, a <node nodeId> contains a <processCreate processId, nodeIdRef> which contains an <agentCreate agentId, processIdRef> which contains a <traceStart traceId, agentIdRef> which, in turn, contains most other elements by means of the traceIdRef. The forgoing nested element hierarchy is established by element referring back to its parent through a specific IdRef attribute.

Many of the trace elements share the same attributes. The following attributes appear in more than one element:
Time
   The time attribute denotes the time at which an event started.
   The format of the time attribute is "utc.fff" where
      1 utc is the number of seconds elapsed (expressed as an unsigned 32-bit value formatted as a string) since midnight (00:00:00), Jan. 1, 1970, coordinated universal time, according to the system clock.
      2 fff is the fraction of seconds (expressed as an unsigned 32-bit value formatted as a string) to the highest precision that can be retrieved.
transientThreadId/transientThreadIdRef
   The transientThreadId attribute defines and transientThreadIdRef attribute refers to the thread that an element has occurs in. The transientThreadId's may be reused as threads are started and ended. The transientThreadId attribute is expressed as an unsigned 32-bit value formatted as a string.
threadId/threadIdRef
   The threadId attribute defines and threadIdRef attribute refers to the thread that an element occurs in. The threadId's are unique within the scope of a trace regardless of how many threads are started and ended. The threadId attribute is expressed as an unsigned 32-bit value formatted as a string.
methodId/methodIdRef
   The methodId attribute defines and the methodIdRef attribute refers to the method that an element is associated with. The methodId's are unique within the scope of a trace regardless of whether the owning class is unloaded. This attribute is also expressed as a 32-bit unsigned value in string format.
transientMethodId/transientMethodIdRef
   The transientMethodId defines and transientMethodIdRef refers to the method that an element is associated with. The transientMethodId's may be reused when their owning classes are unloaded. This attribute is expressed as a 32-bit unsigned value in string format.
lineTableId/lineTableIdRef
   The lineTableId attribute defines and the lineTableIdRef attribute refers to the lineTable element associated with a line reference ticket
   This attribute identifies a specific instance of a method invocation (methodEntry and methodExit, or methodCall and methodReturn), using a counter that is unique within the current thread. The ticket may be a list of 32-bit unsigned values (in string format) to allow for more than 32-bit unsigned values. The ticket attribute syntax is:
   ticket="number[,number]*" where the numbers are listed from low order to high order.
transientObjId/transientObjIdRef
   The transientObjId attribute defines and the transientObjIdRef attribute refers to an object associated with an element. This attribute is expressed as a 32-bit unsigned value in string format. The transientObjId associated with a given object may change during garbage collection. This can be tracked by observing objMove elements. Generally, it is safer to use objId and objIdRef respectively to refer to objects, unless low-level memory analysis is required.
objId/objIdRef
   The objId attribute defines and the objIdRef attribute refers to an object associated with an element. However, unlike transientObjId and transientObjIdRef, this attribute cannot be changed by garbage collection. This attribute is also expressed as a 32-bit unsigned value in string format.

transientClassId/transientClassIdRef

The transientClassId attribute defines and the transientClassIdRef attribute refers to a class associated with an element. This attribute is expressed as a 32-bit unsigned value in string format. The transientClassId attribute associated with a given class may be reused as a result of garbage collection. Such use can be tracked by observing classUnload elements. Generally, it is safer to use classId and classIdRef respectively to refer to classes, unless low-level memory analysis is required.

classId/classIdRef

The classId attribute defines and the classIdRef attribute refers to a class associated with an element, but unlike transientClassId and transientClassIdRef, this attribute is not reused after garbage collection. This attribute is also expressed as a 32-bit unsigned value in string format.

threadCpuTime

This attribute indicates the total CPU time consumed by the current thread in nanoseconds at the time of the event. The format of the threadCpuTime attribute is "sss.fff" where 3 sss is the number of seconds (expressed as a 32-bit unsigned value in string format) of CPU processing time consumed by the thread.

4 fff is the fraction of seconds (expressed as a 32-bit unsigned value in string format) to the highest precision that can be retrieved.

sequenceCounter

This is a counter indicating the sequence of the current event relative to other events associated with the current object. The count is 0 at object allocation and is incremented by one for each:

5 Method entry on a method for the object instance (methodEntry).

6 Method exit on a method for the object instance (methodExit).

7 Free of the object (objFree).

The sequenceCounter remains "0" if invoking a static method.

contextData

This is data provided by a context service to associate with a method entry. A known mechanism is used for registering the context service, and the contents of the contextData attribute is defined by the specific context service.

collationValue

The purpose of this attribute is to allow elements to be collated when emitted on a stream that does not guarantee the order of delivery. The attribute starts from the value "1" on a traceStart element, and is incremented for each element emitted after that. The collationValue is defined by the traceStart and traceEnd elements. The collationValue is a list of 32-bit unsigned values (in string format) to allow for more than 32-bit unsigned values. The collationValue attribute syntax is: collationValue="number[,number]*" where the numbers are listed from low order to high order.

traceId/traceIdRef traceId defines and traceIdRef refers to a UUID (universal unique identifier) that uniquely identifies a trace instance.

isArray

This attribute defines the data type of an array, the values of which are shown in Table 2.

TABLE 2

| VALUE | MEANING |
| --- | --- |
| "0" | normal object (i.e., not an array) |
| "2" | array of objects |
| "4" | array of Booleans |
| "5" | array of chars |
| "6" | array of floats |
| "7" | array of doubles |
| "8" | array of bytes |
| "9" | array of shorts |
| "10" | array of ints |
| "11" | array of longs |

In accordance with the best mode of the invention at the time of filing this application, descriptions will now be provided of the various trace elements formatted in compliance with the XML standard:

traceRoot
<!ELEMENT traceRoot (node | processCreate | agentCreate | agentDestroy | (methodCall | methodReturn | objDef | value | classDef | methodDef | tag | code)* | ( traceStart | traceEnd | processSuspend | processResume | option | filter | classDef | classUnload | methodDef | methodEntry | methodExit | methodCall | value | methodReturn | line | objAlloc | gcAlloc | objFree | objMove | gcFinish | threadStart | threadEnd | runtimeInitDone | runtimeShutdown | throw | catch | methodCount)*)>

As indicated above, traceRoot is the root element for a valid trace XML document as shown in FIG. 2.

objRef
<!ELEMENT objRef EMPTY>
<!ATTLIST objRef
name CDATA #IMPLIED

A string containing the name of the object reference.

transientObjIdRef CDATA #IMPLIED
objIdRef CDATA #IMPLIED
>

This element is used to associate a name with an transientObjId.

code
<!ELEMENT code EMPTY>
<!ATTLIST code
type CDATA #IMPLIED the type of code that exists in this element. Valid types are:

Reference
the value attribute is a reference to an external source for the code.

Java
the value attribute is text containing Java source code.

C++
   the value attribute is text containing C++source code.
C
   the value attribute is text containing C source code.
value CDATA #IMPLIED
   the actual text of the code, or if the type is "Reference", then it contains a reference to an external source for the code. The format of the external reference is a URI.
>

The code element is used to insert textual lines of code into the XML file. Thus, in the event that lines of code are to be preserved when the XML file is parsed, such lines are inserted into the code element with the result that the parser extracts the lines of code exactly as they appear in the element.

```
tag
<!ELEMENT tag EMPTY>
<!ATTLIST tag
name CDATA #IMPLIED
```

The name of the tag.

```
value CDATA #IMPLIED
    The value of the tag.
>
```

The tag element contains the information that is associated with a specific tag, expressed as name value pairs.

Figure 3:
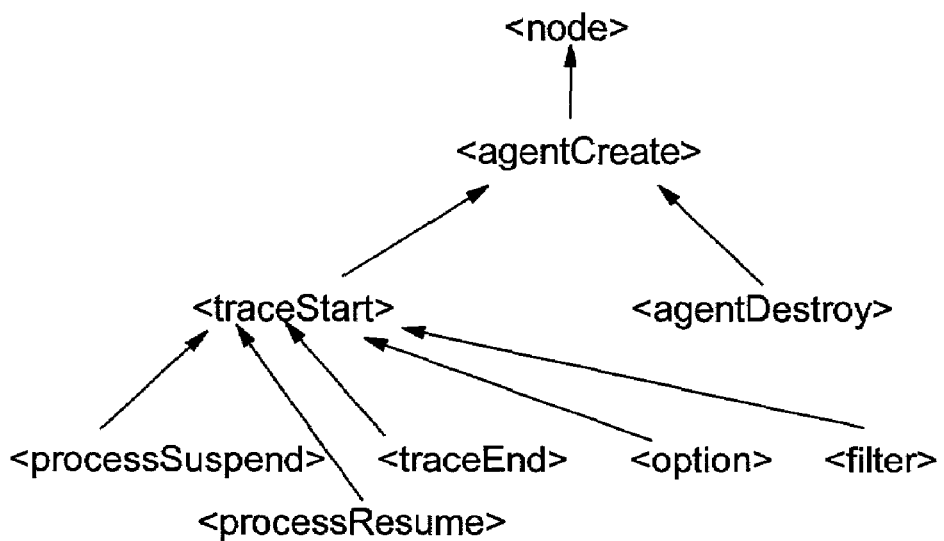
FIG. 3 is a logical hierarchy diagram of trace behavior elements according to the preferred embodiment.

Trace Behaviour
   The following elements provide information about a trace as a whole:
   8 node
   9 processCreate
   10 agentCreate
   11 agentDestroy
   12 traceStart
   13 traceEnd
   14 processSuspend
   15 processResume
   16 option
   17 filter
   The hierarchical relationship of the trace behavior elements is set forth in FIG. 3.

```
node
<! ELEMENT node EMPTY>
<!ATTLIST node
nodeId CDATA #REQUIRED
    a UUID to uniquely refer to this node.
hostname CDATA #REQUIRED
```

The name of the machine on which the instrumented JVM is running.
ipaddress CDATA #REQUIRED
   A list of IP addresses associated with the hostname. The list has the form ipaddress=n1.n2.n3.n4[, m1.m2.m3.m4] * where n and m are unsigned numbers within the range 0 to 255.
   Note: The number of period-delimited numbers that make up an IP address is protocol-specific.

timezone CDATA #IMPLIED
   A positive integer that represents the local time difference in minutes from GMT, moving westward from Greenwich.
time CDATA #IMPLIED
   The time represented here is the time when the machine was last booted, not the time at which this element was generated.

```
>
processCreate
<!ELEMENT processCreate EMPTY>
<!ATTLIST processCreate
processId CDATA #REQUIRED
    a UUID that uniquely identifies this process.
name CDATA #IMPLIED
    the name of the process
pid CDATA #REQUIRED
    the platform-specific process identification
nodeIdRef CDATA #REQUIRED
    a UUID that references the node element that represents the
    host machine.
time CDATA #REQUIRED
```

The time represented here is the time at which the process was started, not the time at which this element was generated.
environment CDATA #IMPLIED
   a string containing platform-specific environment information for the process
applicationExecutable CDATA #IMPLIED
   the name of the application started in the process followed by the parameters passed to the application

```
>
agentCreate
<!ELEMENT agentCreate EMPTY>
<!ATTLIST agentCreate
agentId CDATA #REQUIRED
    a UUID that uniquely identifies this instance of the agent.
processIdRef CDATA #REQUIRED
    a UUID that references the processCreate element that represents
    the process.
agentName CDATA #REQUIRED
    the name of the agent.
time CDATA #REQUIRED
agentParameters CDATA #IMPLIED
```

The option string that was passed to the agent on the -XrunpiAgent parameter.

```
version CDATA #IMPLIED
    a string representing the version of the agent
>
agentDestroy
<!ELEMENT agentDestroy EMPTY>
<!ATTLIST agentDestroy
agentIdRef CDATA #REQUIRED
    a UUID that references the matching agentCreate element.
time CDATA #REQUIRED
>
traceStart
<!ELEMENT traceStart EMPTY>
<!ATTLIST traceStart
traceId CDATA #REQUIRED
agentIdRef CDATA #REQUIRED
```

A UUID that references the agentCreate element that represents the agent that is producing this trace.

```
        time CDATA #REQUIRED
        collationValue CDATA #IMPLIED
>
traceEnd
<!ELEMENT traceEnd EMPTY>
<!ATTLIST traceEnd
traceIdRef CDATA #REQUIRED
time CDATA #REQUIRED
collationValue CDATA #IMPLIED
>
processSuspend
<!ELEMENT processSuspend EMPTY>
<!ATTLIST processSuspend
time CDATA #IMPLIED
traceIdRef CDATA #IMPLIED
>
```

This element indicates that the execution of the process has been suspended.

```
        processResume
        <!ELEMENT processResume EMPTY>
        <!ATTLIST processResume
        time CDATA #IMPLIED
        traceIdRef CDATA #IMPLIED
        >
```

The foregoing element indicates that the execution of the process has resumed.

```
option
<!ELEMENT option EMPTY>
<!ATTLIST option
key CDATA #IMPLIED
    A string that represents the name of the option.
value CDATA #IMPLIED
    A string that represents the value of the option.
traceIdRef CDATA #IMPLIED
>
```

A collection agent 102 may be assigned any number of agent-specific key/value pair options. In addition to the agent performing the specific action as specified by the option, the agent echoes the option through the option element.

```
filter
<!ELEMENT filter EMPTY>
<!ATTLIST filter
pattern CDATA #REQUIRED
    A prefix or suffix string which is compared against the
    class name. (For example, java*", "sun.com.*","*print".)
genericPattern CDATA #REQUIRED
```

Indicates if the pattern contains a wildcard, and what kind of wildcard it has. The values are:

none
    The pattern requires an exact match.
prefix
    The pattern has a prefix wildcard and matches anything ending with the pattern.
suffix
    The pattern has a suffix wildcard and matches anything starting with the pattern.
mode CDATA #REQUIRED
    Either include or exclude.
traceIdRef CDATA #IMPLIED
>

The class filter is set by a client 104. Filters control which classes are traced using the profiling tool of the present invention. Filters are provided in blocks where a new block of filters completely replaces the current filter definitions. Matching is done by querying the active block of filters until the first match is found based on the supplied pattern. The class is then either included or excluded from the trace based on the mode. If the entire block of filters is traversed and no match is found, then the class is included in the trace. It should be noted that some classes are included in the trace even if they have been filtered out. This occurs if a reference is made to the class from a class that has not been filtered out. For example, the methodCall element can cause this to occur.

Threads

Figure 4:
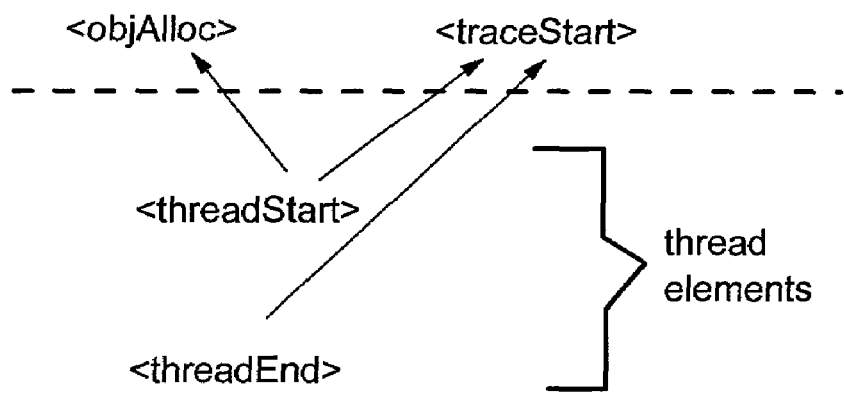
FIG. 4 is a logical hierarchy diagram of thread elements according to the preferred embodiment.

The elements which provide information about threads are set forth in FIG. 4. Other elements point to a THREAD element's transientThreadId to identify the thread they are running in.

```
        threadStart
        <!ELEMENT threadStart EMPTY>
        <!ATTLIST threadStart
        transientThreadId CDATA #IMPLIED
```

This attribute identifies the thread, and allows other trace elements to reference it through the transientThreadIdRef attribute.
threadId CDATA #IMPLIED
    This attribute identifies the thread, and allows other trace elements to reference it through the threadIdRef attribute.
time CDATA #IMPLIED
groupName CDATA #IMPLIED
    Group to which the thread belongs.
parentName CDATA #IMPLIED
    Name of parent.
transientObjIdRef CDATA #IMPLIED
    The objAlloc that defines this transientObjIdRef may not be available, so the possibility of a dangling reference must be accounted for.
objIdRef CDATA #IMPLIED
    The objAlloc that defines this objIdRef may not be available. In this case the value of objIdRef is "0".
threadName CDATA #IMPLIED
    Name of thread being started.

```
            collationValue CDATA #IMPLIED
            traceIdRef CDATA #IMPLIED
        >
        threadEnd
        <!ELEMENT threadEnd EMPTY>
        <!ATTLIST threadEnd
            transientThreadIdRef CDATA #IMPLIED
            threadIdRef CDATA #IMPLIED
            time CDATA #IMPLIED
            collationValue CDATA #IMPLIED
            traceIdRef CDATA #IMPLIED
        >
```

This element indicates the end of the thread identified by the transientThreadIdRef or threadIdRef value.

Classes

Figure 5:
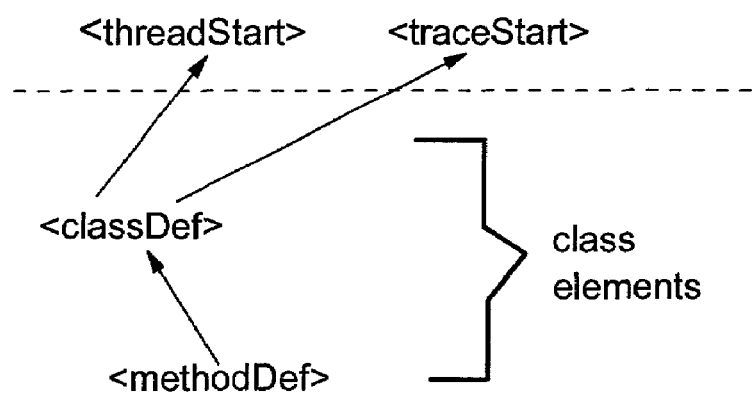
FIG. 5 is a logical hierarchy diagram of class elements according to the preferred embodiment.

The hierarchical relationship of the class elements is set forth in FIG. 5. Definitions of these elements are as follows:

```
            classDef
            <!ELEMENT classDef EMPTY>
            <!ATTLIST classDef
            transientThreadIdRef CDATA #IMPLIED
            threadIdRef CDATA #IMPLIED
            time CDATA #IMPLIED
```

The time represented here is the actual time that the class was loaded, not the time at which this element was generated.

numInterfaces CDATA #IMPLIED
    Number of interfaces implemented by this class. Expressed as an unsigned 32-bit value in string format.

```
            transientClassId CDATA #IMPLIED
            classId CDATA #IMPLIED
            sourceName CDATA #IMPLIED
```

A string containing the fully qualified path of the class source file. (Note: this is revisited to enhance the specification to support more languages beyond Java). If for some reason the source file name cannot be determined, the string "" is returned.

name CDATA #IMPLIED
    The name of the class. If for some reason the source file name cannot be determined, the string "" is returned.

access CDATA #IMPLIED
    The access type for this class. The valid values are "public", "private", . . .

numStaticFields CDATA #IMPLIED
    The number of static fields declared within the class. Expressed as an unsigned 32-bit value in string format.

numMethods CDATA #IMPLIED
    The number of methods defined within the class. Expressed as an unsigned 32-bit value in string format.

numInstanceFields CDATA #IMPLIED
    The number of instance fields declared within the class. Expressed as an unsigned 32-bit value in string format.

```
            collationValue CDATA #IMPLIED
            traceIdRef CDATA #IMPLIED
        >
```

The foregoing element defines a class.

```
        methodDef
        <!ELEMENT methodDef return? parameter* exception*>
        <!ATTLIST methodDef
            name CDATA #IMPLIED
```

A string containing the name of the method.

signature CDATA #IMPLIED
    A string containing the signature of the method. The signature is expressed in the notation specified by the sigNotation attribute.

access CDATA #IMPLIED
    The access type for this method. The valid values are "public", "private", . . .

startLineNumber CDATA #IMPLIED
    The starting source line number of the method. Note: This attribute may not be produced if the source line information is not available.

endLineNumber CDATA #IMPLIED
    The ending source line number of the method. Note: This attribute may not be produced if the source line information is not available.

sigNotation CDATA #IMPLIED
    Contains a value that declares the notation the signature is expressed in. Supported values are in Table 3.

TABLE 3

| sigNotation value | COMMENTS |
| --- | --- |
| JNI | Currently only JNI signature notation is supported. If this attribute is not present, the value JNI is assumed. JNI signature notation is defined in the Java Native Interface Specification |
| XML | The signature is specified by child elements of this methodDef element. In this case, the signature attribute may be an empty string. |

```
            transientClassIdRef CDATA #IMPLIED
            classIdRef CDATA #IMPLIED
            methodId CDATA #IMPLIED
```

The identifier of the method.
transientMethodId CDATA #IMPLIED
    The identifier of the method.

```
            collationValue CDATA #IMPLIED
            traceIdRef CDATA #IMPLIED
        >
```

Although technically part of the classDef event, the methodDef element is broken out into a separate element so that it can be optionally output only when referenced.

```
Return
<!ELEMENT return EMPTY>
<!ATTLIST return
transientClassIdRef CDATA #IMPLIED
classIdRef CDATA #IMPLIED
>
parameter
<!ELEMENT parameter EMPTY>
<!ATTLIST parameter
name CDATA #IMPLIED
    A string containing the name of the parameter.
transientClassIdRef CDATA #IMPLIED
classIdRef CDATA #IMPLIED
>
exception
<!ELEMENT exception EMPTY>
<!ATTLIST exception
transientClassIdRef CDATA #IMPLIED
classIdRef CDATA #IMPLIED
>
Objects
```

Figure 6:
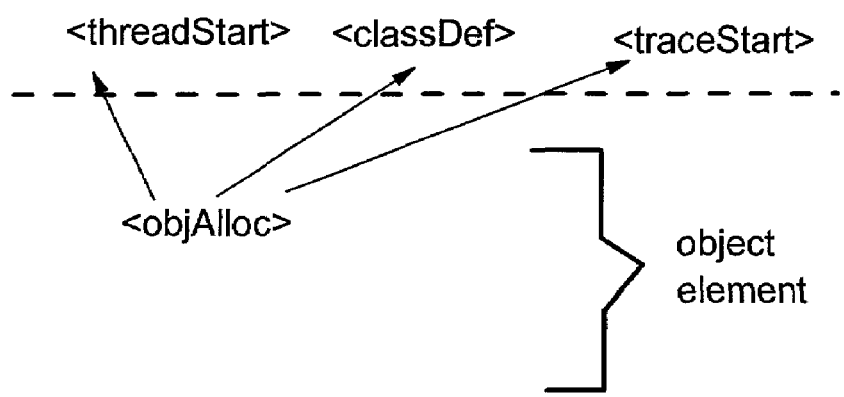
FIG. 6 is a logical hierarchy diagram of object elements according to the preferred embodiment.
Figure 7:
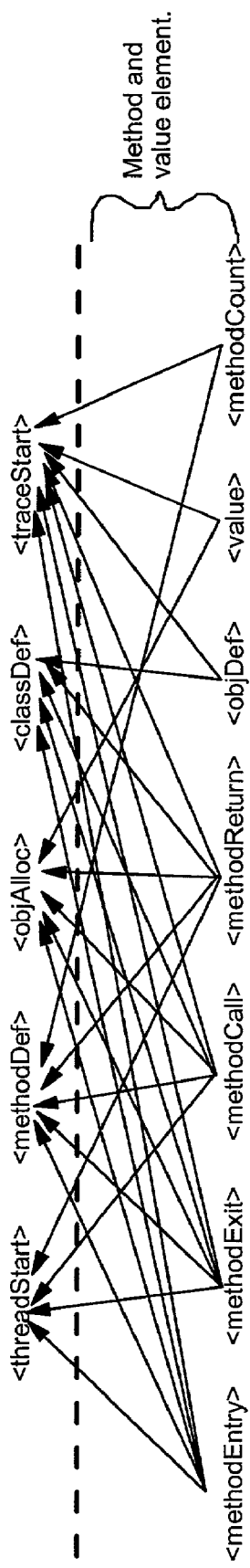
FIG. 7 is a logical hierarchy diagram of method elements according to the preferred embodiment.
Figure 8:
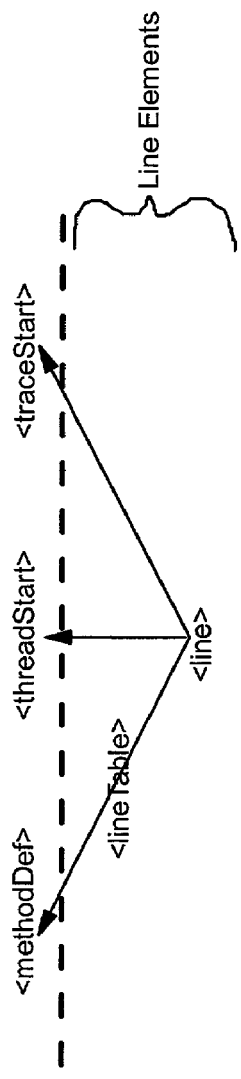
FIG. 8 is a logical hierarchy diagram of line elements according to the preferred embodiment.
Figure 9:
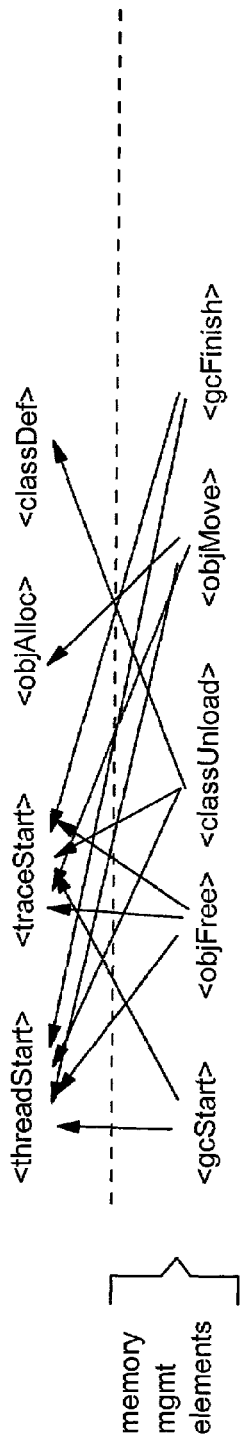
FIG. 9 is a logical hierarchy diagram of memory management elements according to the preferred embodiment.
Figure 10:
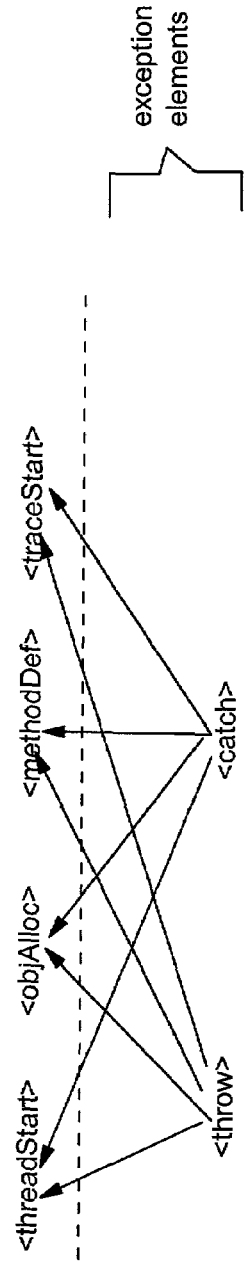
FIG. 10 is a logical hierarchy diagram of exception elements according to the preferred embodiment.
Figure 11:
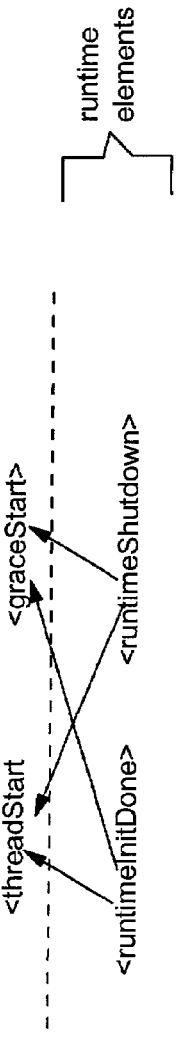
FIG. 11 is a logical hierarchy diagram of runtime elements according to the preferred embodiment.

The hierarchical relationship of the object elements is set forth in FIG. 6.

```
objAlloc
<!ELEMENT objAlloc EMPTY>
<!ATTLIST objAlloc
transientThreadIdRef CDATA #IMPLIED
threadIdRef CDATA #IMPLIED
time CDATA #IMPLIED
isArray CDATA #IMPLIED
transientObjId CDATA #IMPLIED
objId CDATA #IMPLIED
size CDATA #IMPLIED
```

Size in number of bytes expressed as an unsigned 32-bit value in string format.
transientClassIdRef CDATA #IMPLIED
  a reference to the class to which this object belongs, or the array element class if isArray is "2" (array of objects)
classIdRef CDATA #IMPLIED
  a reference to the class to which this object belongs, or the array element class if isArray is "2" (array of objects)
contextData CDATA #IMPLIED
  Data provided by the context service to associate with the object allocation. The mechanism for registering the context service is still to be defined. The contents of the contextData attribute is defined by the specific context service.

```
collationValue CDATA #IMPLIED
traceIdRef CDATA #IMPLIED
>
```

This element traces storage allocation. It can be used in conjunction with other elements such as the methodEntry element to identify an associated object.

Methods and Values

The methodEntry and methodExit elements are output when a method is entered, and when the method returns respectively. The methodCall and methodReturn elements are output when a method is about to be called, and after a method returns. It is not necessary for an agent to produce both methodEntry/Exit and methodCall/Return for a each method invocation. The semantics associated with the generation of these elements is agent specific. The hierarchical arrangement of these elements is set forth in FIG. 7.

```
methodEntry
<!ELEMENT methodEntry (value*)>
<!ATTLIST methodEntry
transientThreadIdRef CDATA #IMPLIED
threadIdRef CDATA #IMPLIED
time CDATA #IMPLIED
methodIdRef CDATA #IMPLIED
transientMethodIdRef CDATA #IMPLIED
ticket CDATA #IMPLIED
transientObjIdRef CDATA #IMPLIED
```

This value is "0" if invoking a static method.
objIdRef CDATA #IMPLIED
  This value is "0" if invoking a static method.

```
transientClassIdRef CDATA #IMPLIED
classIdRef CDATA #IMPLIED
threadCpuTime CDATA #IMPLIED
sequenceCounter CDATA #IMPLIED
contextData CDATA #IMPLIED
stackDepth CDATA #IMPLIED
```

The current depth of the stack including the current method being executed.

```
collationValue CDATA #IMPLIED
traceIdRef CDATA #IMPLIED
>
```

Note: the optional nested value elements represent parameter values.

```
methodExit
<!ELEMENT methodExit (value*)>
<!ATTLIST methodExit
transientThreadIdRef CDATA #IMPLIED
threadIdRef CDATA #IMPLIED
time CDATA #IMPLIED
ticket CDATA #IMPLIED
threadCpuTime CDATA #IMPLIED
methodIdRef CDATA #IMPLIED
transientMethodIdRef CDATA #IMPLIED
transientObjIdRef CDATA #IMPLIED
```

This value is "0" if exiting a static method.
objIdRef CDATA #IMPLIED
  This value is "0" if exiting a static method.

```
transientClassIdRef CDATA #IMPLIED
classIdRef CDATA #IMPLIED
sequenceCounter CDATA #IMPLIED
contextData CDATA #IMPLIED
collationValue CDATA #IMPLIED
traceIdRef CDATA #IMPLIED
>
```

Note:
the optional nested value elements represent parameter values and return value.

methodCall
<!ELEMENT methodCall (value*)>
<!ATTLIST methodCall
transientThreadIdRef CDATA #IMPLIED
threadIdRef CDATA #IMPLIED
time CDATA #IMPLIED
methodIdRef CDATA #IMPLIED
transientMethodIdRef CDATA #IMPLIED
ticket CDATA #IMPLIED
transientObjIdRef CDATA #IMPLIED This value is "0" if invoking a static method.
objIdRef CDATA #IMPLIED
This value is "0" if invoking a static method.

transientClassIdRef CDATA #IMPLIED
classIdRef CDATA #IMPLIED
threadCpuTime CDATA #IMPLIED
sequenceCounter CDATA #IMPLIED
contextData CDATA #IMPLIED
stackDepth CDATA #IMPLIED The current depth of the stack including the current method being executed.

collationValue CDATA #IMPLIED
traceIdRef CDATA #IMPLIED
>

Note:
the optional nested value elements represent parameter values.

methodReturn
<!ELEMENT methodReturn (value*)>
<!ATTLIST methodReturn
transientThreadIdRef CDATA #IMPLIED
threadIdRef CDATA #IMPLIED
time CDATA #IMPLIED
ticket CDATA #IMPLIED
threadCpuTime CDATA #IMPLIED
methodIdRef CDATA #IMPLIED
transientMethodIdRef CDATA #IMPLIED
transientObjIdRef CDATA #IMPLIED This value is "0" if returning from a static method.
objIdRef CDATA #IMPLIED
This value is "0" if returning from a static method.

transientClassIdRef CDATA #IMPLIED
classIdRef CDATA #IMPLIED
sequenceCounter CDATA #IMPLIED
contextData CDATA #IMPLIED
collationValue CDATA #IMPLIED
traceIdRef CDATA #IMPLIED
>

Note:
the optional nested value elements represent parameter values and return value.

objDef
<!ELEMENT objDef EMPTY>
<!ATTLIST objDef
objId CDATA #REQUIRED
isArray CDATA #IMPLIED
size CDATA #IMPLIED Size in number of bytes expressed as an unsigned 32-bit value in string format.
classIdRef CDATA #IMPLIED
a reference to the class to which this object belongs, or the array element class if isArray is "2" (array of objects)

collationValue CDATA #IMPLIED
traceIdRef CDATA #IMPLIED
<

The objDef element holds identity information for an object, which can be referred to by elements associated with the object, such as the value element.

value
<!ELEMENT value pcdata>
<!ATTLIST value
parameterName CDATA #IMPLIED

An optional parameter name associated with the value.
referenceName CDATA #IMPLIED
An optional reference name associated with the value. For example, a variable name.
objIdRef CDATA #IMPLIED
Refers the object associated with this value. The objIdRef value is "0" if the value is a primitive type.
serializationFormat CDATA #IMPLIED
An implementation defined value that identifies the format used to serialize the object value.
type CDATA #IMPLIED
Is one of the following in Table 4.

TABLE 4

| Type | Value |
|---|---|
| "serializedObjValueRef" | the value attribute is a reference (format to be defined) to a serialized object located elsewhere |
| "serializedObjValue" | the value attribute is a serialized object. |
| "serializedObjValueInline" | the serialized object is located in the pcdata. The value attribute is not used when this type is specified. |
| "boolean" | the value attribute is a string representation of a boolean value |
| "char" | the value attribute is a string representation of a char value |
| "int" | the value attribute is a string representation of an int value |
| "long" | the value attribute is a string representation of a long value |
| "float" | the value attribute is a string representation of a float value |
| "double" | the value attribute is a string representation of a double value |
| "string" | the value attribute is a string |
| "opaque" | the value is unknown. The value attribute is not used when this type is specified. | value CDATA #IMPLIED
    The actual value of the data as specified by the type attribute.

```
collationValue CDATA #IMPLIED
traceIdRef CDATA #IMPLIED
>
```

The value element is used to reference a data value, either for parameter values in a methodCall, or for the return value of a methodReturn.

```
methodCount
<!ELEMENT methodCount EMPTY>
<!ATTLIST methodCount
count CDATA #IMPLIED
```

The number of times the method has been invoked since the start of the trace. Expressed as a 32-bit unsigned value in string format. This value is maintained even while tracing is suspended.

methodIdRef CDATA #IMPLIED
    Refers to the id of the method being counted.
transientMethodIdRef CDATA #IMPLIED
    Refers to the id of the method being counted.

```
collationValue CDATA #IMPLIED
traceIdRef CDATA #IMPLIED
>
```

The methodCount element tracks the number of times a particular method has been invoked. This element is designed to aid in collecting code coverage information. A methodCount element is produced for every method for every class loaded by the application. The count includes all method invocations regardless of whether tracing has been enabled or not. In other words, the data is collected even before a traceStart and even after a traceEnd. The elements are produced just prior to the agentDestroy element being produced. In addition, an agent may be requested to produce the methodCount elements at any arbitrary time before the agentDestroy element is produced.

Lines

These elements are designed to capture line coverage type information. The hierarchical arrangement of these elements is set forth in FIG. 8.

```
lineTable
<!ELEMENT lineTable EMPTY>
<!ATTLIST lineTable
lineTableId CDATA #REQUIRED
methodIdRef CDATA #REQUIRED
sourceName CDATA #IMPLIED
startLine CDATA #IMPLIED
endLine CDATA #IMPLIED
sourceCoordinateType CDATA #IMPLIED
```

Specifies the type of the source coordinates specified in the sourceCoordinateTable attribute.

The following values are defined:
    "lineNumber"—the values in the sourceCoordinateTable are source line numbers. This is the simplest numbering scheme, but it fails to allow fine grained mapping for multiple Coverage Blocks on a single line.
    "byteOffset"—the values in the sourceCoordinateTable are byte offsets into the file. A precise location in the file of the start of the source for the given Coverage Block.

sourceCoordinateTable CDATA #IMPLIED
    space delimited list of values in Coverage Block order that represents a source coordinates of the type specified by the sourceCoordinateType attribute. The table is indexed by Coverage Block number. A Coverage Block is defined as follows:
    18 Basic Block (BB)—contiguous instructions block with exactly one entry and one exit point.
    19 Coverage Block (CB)—BB with some restrictions. Each source line start considered a label thus adding an entry point. Each call statement considered as a potential exit point. Each exception-handling block considered an entry point. In some cases instructions capable of rising exceptions may be considered as exit points.
>

One LINE_TABLE is provided per file segment which the method source is located in. By defining startLine and endLine, a line number table has to be a continuous segment of source.

```
line
<!ELEMENT line EMPTY>
<!ATTLIST line
transientThreadIdRef CDATA #IMPLIED
threadIdRef CDATA #IMPLIED
lineTableIdRef CDATA #IMPLIED
time CDATA #IMPLIED
blockIndex CDATA #IMPLIED
```

An index into the sourceCoordinateTable of the associated lineTable. This allows the Coverage Block number to be mapped to the source coordinates of the source being executed. Expressed as a 32-bit unsigned value in string format.

```
traceIdRef CDATA #IMPLIED
>
```

This element is produced for each Coverage Block that is executed.

Memory Management

The gcStart, objFree, classUnload, objMove, and gcFinish elements (along with objAlloc) are for tracing storage management. The hierarchical arrangement of these elements is set forth in FIG. 9.

```
GcStart
<!ELEMENT gcStart EMPTY>
<!ATTLIST gcStart
transientThreadIdRef CDATA #IMPLIED
threadIdRef CDATA #IMPLIED
time CDATA #IMPLIED
```

-continued

```
    collationValue CDATA #IMPLIED
    traceIdRef CDATA #IMPLIED
>
```

This element is produced when garbage collection (GC) is about to start.

```
objFree
<!ELEMENT objFree EMPTY>
<!ATTLIST objFree
    transientThreadIdRef CDATA #IMPLIED
    threadIdRef CDATA #IMPLIED
    time CDATA #IMPLIED
    transientObjIdRef CDATA #IMPLIED
    objIdRef CDATA #IMPLIED
    sequenceCounter CDATA #IMPLIED
    contextData CDATA #IMPLIED
    collationValue CDATA #IMPLIED
    traceIdRef CDATA #IMPLIED
>
```

This element is produced when an object is freed.

```
classUnload
<!ELEMENT classUnload EMPTY>
<!ATTLIST classUnload
    transientThreadIdRef CDATA #IMPLIED
    threadIdRef CDATA #IMPLIED
    time CDATA #IMPLIED
    transientClassIdRef CDATA #IMPLIED
    classIdRef CDATA #IMPLIED
    collationValue CDATA #IMPLIED
    traceIdRef CDATA #IMPLIED
>
```

```
objMove
<!ELEMENT objMove EMPTY>
<!ATTLIST objMove
    transientThreadIdRef CDATA #IMPLIED
    threadIdRef CDATA #IMPLIED
    time CDATA #IMPLIED
    transientObjIdRef CDATA #IMPLIED
    objIdRef CDATA #IMPLIED
    newObjId CDATA #IMPLIED
```

The new object id. See transientObjId for more information

```
    collationValue CDATA #IMPLIED
    traceIdRef CDATA #IMPLIED
>
```

This element is produced when an object is moved in the heap, and is always sent between a pair of gcStart and gcFinish elements. When an object is moved, its transientObjId is changed. All future references to this object use the new transientObjId value. To avoid having to map and track these changes, it is much simpler to use the objId to refer to the object, as this id does not change. Note: Because objId, classId, objIdRef and classIdRef are provided, it is anticipated that objMove need not be traced by a client unless low level memory analysis is required.

```
gcFinish
<!ELEMENT gcFinish EMPTY>
<!ATTLIST gcFinish
    transientThreadIdRef CDATA #IMPLIED
    threadIdRef CDATA #IMPLIED
    time CDATA #IMPLIED
    totalObjSpace CDATA #IMPLIED
```

Total amount of object space (in bytes) expressed as a 32-bit unsigned value in string format.
usedObjSpace CDATA #IMPLIED
Amount of space used by the objects (in bytes) expressed as a 32-bit unsigned value in string format.
usedObjects CDATA #IMPLIED
Number of used objects on the heap expressed as a 32-bit unsigned value in string format.

```
    collationValue CDATA #IMPLIED
    traceIdRef CDATA #IMPLIED
>
```

This element is produced when the garbage collection phase is finished.

Exceptions

The throw and catch elements encapsulate the exception behavior of an application. The hierarchical arrangement of these elements is set forth in FIG. 10.

```
throw
<!ELEMENT throw EMPTY>
<!ATTLIST throw
    transientThreadIdRef CDATA #IMPLIED
    threadIdRef CDATA #IMPLIED
    time CDATA #IMPLIED
    objIdRef CDATA #IMPLIED
```

The objIdRef is not available if the class of the exception object is being filtered out. When this is the case, the objIdRef attribute is set to the value "-Unavailable-".JVMPI Implementation Note: The objIdRef may not be available for all versions of the JVM. Some JVMs do not provide the API required to map the exception objects handle to an transientObjId. When this is the case, the objIdRef attribute is set to the value "-Unavailable-".
transientObjIdRef CDATA #IMPLIED
JVMPI Implementation Note: The transientObjIdRef may not be available for all versions of the JVM. Some JVMs do not provide the API required to map the exception objects handle to an transientObjId. When this is the case, the transientObjIdRef attribute is set to the value "-Unavailable-".
objHandle CDATA #IMPLIED
Represents the original object handle of the exception object. This handle does not correlate to transientObjId or objId attributes and thus cannot be used to determine the class of the exception object. It is emitted as a 32-bit unsigned value in string format. This attribute is provided solely to be able to correlate THROW and CATCH elements with each other when the transientObjId and objId attributes are unavailable. See the description of the transientObjIdRef and objIdRef attributes for a discussion of their availability.

methodIdRef CDATA #IMPLIED

The identifier of the method on which the exception is thrown (also called the method which is processing the exception).

transientMethodIdRef CDATA #IMPLIED

The identifier of the method on which the exception is thrown (also called the method which is processing the exception).

ticket CDATA #IMPLIED

The ticket value of the method on which the exception is thrown (also called the method which is processing the exception).

--- collationValue CDATA #IMPLIED
traceIdRef CDATA #IMPLIED
>

---

When an exception is thrown, a throw element is generated for each unfiltered stack frame that processes the exception. Processing the exception includes simply letting the exception percolate to the next stack frame. A throw element is also generated for the stack frame that catches the exception.

--- catch
<!ELEMENT catch EMPTY>
<!ATTLIST catch
transientThreadIdRef CDATA #IMPLIED
threadIdRef CDATA #IMPLIED
time CDATA #IMPLIED
objIdRef CDATA #IMPLIED

---

A reference to the exception object. The objIdRef is not available if the class of the exception object is being filtered out. When this is the case, the objIdRef attribute is set to the value "-Unavailable-".Implementation Note: The objIdRef may not be available for all versions of the JVM. Some JVMs do not provide the API required to map the exception objects handle to an transientObjId. When this is the case, the objIdRef attribute is set to the value "-Unavailable-".

transientObjIdRef CDATA #IMPLIED

A reference to the exception object. Implementation Note: The transientObjIdRef may not be available for all versions of the JVM. Some JVMs do not provide the API required to map the exception objects handle to an transientObjId. When this is the case, the transientObjIdRef attribute is set to the value "-Unavailable-".

objHandle CDATA #IMPLIED

Represents the original object handle of the exception object. This handle does not correlate to transientObjId or objId attributes and thus cannot be used to determine the class of the exception object. It is emitted as a 32-bit unsigned value in string format. This attribute is provided solely to be able to correlate THROW and CATCH elements with each other when the transientObjId and objId attributes are unavailable. See the description of the transientObjIdRef and objIdRef attributes for a discussion of their availability.

methodIdRef CDATA #IMPLIED

The identifier of the method on which the exception is caught.

transientMethodIdRef CDATA #IMPLIED

The identifier of the method on which the exception is caught.

ticket CDATA #IMPLIED

The ticket value of the method on which the exception is caught.

--- collationValue CDATA #IMPLIED
traceIdRef CDATA #IMPLIED
>

---

A catch element is generated when the exception reaches an unfiltered stack frame that defines a catch clause for the exception.

Runtime

These elements track the initialization and shutdown of the program runtime. The hierarchical arrangement of these elements is set forth in FIG. 11.

--- runtimeInitDone
<!ELEMENT runtimeInitDone EMPTY>
<!ATTLIST runtimeInitDone
transientThreadIdRef CDATA #IMPLIED
threadIdRef CDATA #IMPLIED
time CDATA #IMPLIED
collationValue CDATA #IMPLIED
traceIdRef CDATA #IMPLIED
>

---

The runtimeInitDone element is produced when the program runtime environment initialization is complete (e.g., for Java it is produced when the JVM initialization is done).

--- runtimeShutdown
<!ELEMENT runtimeShutdown EMPTY>
<!ATTLIST runtimeShutdown
transientThreadIdRef CDATA #IMPLIED
threadIdRef CDATA #IMPLIED
time CDATA #IMPLIED
collationValue CDATA #IMPLIED
traceIdRef CDATA #IMPLIED
>

---

The runtimeShutdown element is produced when the program runtime environment terminates (e.g., for Java it is produced when the JVM being traced is shutting down).

Turning to FIG. 12, parts of a sample trace are shown. The illustrated sample is set forth solely for purposes of illustration and is not intended to limit the scope of the invention. Text denoted as 1200 is a header showing the context of the trace, which provided, for example, nodeId (node id reference) as "60646da0-3298-11d5-a73d-a0c48e000000". Text denoted as 1202 shows the nested hierarchical structure of the trace elements. For example, <methodEntry threadIdRef="2" time="987446612.236409" methodIdRef="2612" objIdRef="2627" classIdRef="2617" threadCpuTime="0.2303312" stackDepth="1"/> shows that a method 2612 called object 2627 of class 2617 at time 987446612.236409. Text denoted as 1204 shows the end of this trace.

Variations and modifications of the invention are contemplated. For example, the specific XML code fragments set forth herein are provided for the purpose of establishing a best mode of the invention. A person of ordinary skill in the art may conceive of other modes of expressing the functionality inherent in the disclosed code. Such a person may also conceive of further alternative embodiments of the invention, all of which are believed to fall within the sphere and scope of the invention as defined by the appended claims.

What is claimed is:

1. A system for providing access to profiling data of trace events of an application over a network, comprising:
    a profiling interface for transmitting said trace events of said application; and
    a collection agent for receiving and encoding said trace events into representative trace elements, each trace element containing at least one correlation attribute, and in response transmitting said trace elements over said network for at least one analysis client to receive and correlate said trace elements in accordance with said at least one correlation attribute.

2. The system of claim 1, wherein said at least one correlation attribute in each of said trace elements comprises an identifier (Id).

3. The system of claim 1, wherein said at least one correlation attribute in each of said trace elements for relating to a parent trace element comprises an identifier reference (IdRef) of said parent trace element.

4. The method of claim 1, wherein the application is distributed in the network such that a first component of the application executes on a first data processing device of the network and a second component of the application executes on a second data processing device in the network, and wherein the correlation attribute correlates trace elements generated by the first component with trace elements generated by the second component.

5. The method of claim 1, wherein the profiling interface provides a mechanism for exchanging trace events between the collection agent and the at least one analysis agent, wherein the collection agent and the at least one analysis agent are part of a profiling tool.

6. A method of providing access to profiling data of trace elements of an application over a network, comprising:
    transmitting said trace events of said application; and
    receiving and encoding said trace events into representative trace elements, each trace element containing at least one correlation attribute, and in response transmitting said trace elements over said network for at least one analysis client to receive and correlate said trace elements in accordance with said at least one correlation attribute.

7. The method of claim 6, wherein said at least one correlation attribute in each of said trace elements comprises an identifier (Id).

8. The method of claim 6, wherein said at least one correlation attribute in each of said trace elements for relating to a parent trace element comprises an identifier reference (IdRef) of said parent trace element.

9. The method of claim 6, wherein the application is distributed in the network such that a first component of the application executes on a first data processing device of the network and a second component of the application executes on a second data processing device in the network, and wherein the correlation attribute correlates trace elements generated by the first component with trace elements generated by the second component.

10. A data structure, embodied in a computer readable medium, for providing profiling data in the form of trace elements from collection agents to analysis agents, said data structure comprising trace elements for representing trace events of an application, each of said trace elements comprising at least one correlation attribute for defining a logical hierarchy between said trace elements.

11. The data structure of claim 10, wherein said at least one correlation attribute in each of said trace elements comprises an identifier (Id).

12. The data structure of claim 11, wherein said trace elements are written in an open mark-up language.

13. The data structure of claim 10, wherein said at least one correlation attribute in each of said trace elements for relating to a parent trace element comprises an identifier reference (IdRef) of said parent trace element.

14. The data structure of claim 10, wherein the application is distributed in a network such that a first component of the application executes on a first data processing device of the network and a second component of the application executes on a second data processing device in the network, and wherein the correlation attribute correlates trace elements generated by the first component with trace elements generated by the second component.

15. A collection agent, in a data processing system, for collecting and communicating profiling data of trace events of an application according to a data structure, wherein the improvement comprises:
    said data structure comprising trace elements for representing said trace events of an application, each of said trace elements comprising at least one correlation attribute for defining a logical hierarchy between said trace elements.

16. The collection agent of claim 15, wherein said at least one correlation attribute in each of said trace elements comprises an identifier (Id).

17. The collection agent of claim 15, wherein said at least one correlation attribute in each of said trace elements for relating to a parent trace element comprises an identifier reference (IdRef) of said parent trace element.

18. The collection agent of claim 15, wherein the application is distributed in a network such that a first component of the application executes on a first data processing device of the network and a second component of the application executes on a second data processing device in the network, and wherein the correlation attribute correlates trace elements generated by the first component with trace elements generated by the second component.

19. An analysis agent, in a data processing system, for receiving profiling data of trace events of an application according to a data structure, wherein the improvement comprises:
    said data structure embodied in a computer readable medium comprising trace elements for representing said trace events of an application, each of said trace elements comprising at least one correlation attribute for defining a logical hierarchy between said trace elements.

20. The analysis agent of claim 19, wherein said at least one correlation attribute in each of said trace elements comprises an identifier (Id).

21. The analysis agent of claim 19, wherein said at least one correlation attribute in each of said trace elements for relation to a parent trace element comprises an identifier reference (IdRef) of said parent trace element.

22. The analysis agent of claim 20, wherein said trace elements are written in an open mark-up language.

23. The analysis agent of claim 19, wherein the application is distributed in a network such that a first component of the application executes on a first data processing device of the network and a second component of the application executes on a second data processing device in the network, and wherein the correlation attribute correlates trace elements generated by the first component with trace elements generated by the second component.

24. An article comprising
a computer-readable data storage medium;
means recorded on the medium for providing access to profiling data of an application over a network;
means recorded on the medium for transmitting trace events of said application; and
means recorded on the medium for receiving and encoding said trace events into corresponding trace elements, each trace element containing at least one correlation attribute, and in response transmitting said trace elements over said network for at least one analysis client to receive and correlate said trace elements in accordance with said at least one correlation attribute.

25. The article of claim 24, wherein said at least one correlation attribute in each of said trace elements comprises an identifier (Id).

26. The article of claim 24, wherein said at least one correlation attribute in each of said trace elements for relating to a parent trace element comprises an identifier reference (IdRef) of said parent trace element.

27. The article of claim 24, wherein the application is distributed in the network such that a first component of the application executes on a first data processing device of the network and a second component of the application executes on a second data processing device in the network, and wherein the correlation attribute correlates trace elements generated by the first component with trace elements generated by the second component.

* * * * *